United States Patent [19]

Hori

[11] Patent Number: 5,303,129
[45] Date of Patent: * Apr. 12, 1994

[54] LAMP ARRANGEMENT FOR MOTOR VEHICLE

[75] Inventor: Masayuki Hori, Yokosuka, Japan

[73] Assignee: Nissan Motor Co., Ltd., Yokohama, Japan

[ * ] Notice: The portion of the term of this patent subsequent to Feb. 16, 2010 has been disclaimed.

[21] Appl. No.: 921,803

[22] Filed: Jul. 30, 1992

Related U.S. Application Data

[63] Continuation-in-part of Ser. No. 866,966, Apr. 10, 1992, Pat. No. 5,186,533, which is a continuation of Ser. No. 646,541, Jan. 28, 1991, abandoned.

[30] Foreign Application Priority Data

Jan. 30, 1990 [JP] Japan .................................. 2-20242

[51] Int. Cl.⁵ .............................................. B60Q 1/26
[52] U.S. Cl. .................... 362/80.1; 340/479; 359/15
[58] Field of Search ........................ 362/80.1; 340/479; 359/13, 22, 25, 630, 15

[56] References Cited

U.S. PATENT DOCUMENTS

| | | |
|---|---|---|
| 3,405,614 | 10/1968 | Lin et al. . |
| 4,036,552 | 7/1977 | Lee et al. . |
| 4,824,193 | 4/1989 | Maeda et al. .......................... 359/15 |
| 4,892,369 | 1/1990 | Moss . |
| 4,916,593 | 4/1990 | Moss et al. . |
| 4,935,722 | 6/1990 | Pollack . |
| 4,966,426 | 10/1992 | Moss et al. . |
| 5,112,121 | 5/1992 | Chang et al. ........................... 359/15 |
| 5,138,470 | 8/1992 | Moss et al. ............................ 359/15 |

*Primary Examiner*—Carroll B. Dority
*Attorney, Agent, or Firm*—Lowe, Price, LeBlanc & Becker

[57] ABSTRACT

A light arrangement in the form of a center high mounted brakelight is shown. A surface light source disposed below a rear window of the vehicle and includes a plurality of diverging light sources, each emitting a diverging light for interference with a hologram assembly affixed to the inner surface of the rear window. The hologram assembly includes a plurality of holograms which were produced by holography by exposure to a converging beam from the area where the surface light source is arranged after mounting said hologram assembly in the vehicle.

4 Claims, 9 Drawing Sheets

LAMP ARRANGEMENT FOR MOTOR VEHICLE

STATUS OF THE APPLICATION

The present application is a continuation in-part of continuation application Ser. No. 07/866,966 filed on Apr. 10, 1992, now U.S. Pat. No. 5,186,533 of prior application Ser. No. 07/646,541 now abandoned, field on Jan. 28, 1991, entitled LAMP ARRANGEMENT FOR MOTOR VEHICLE.

BACKGROUND OF THE INVENTION

The present invention relates to a lamp arrangement for a vehicle and, more particularly to a light using a holographic structure.

An object of the present invention is to provide a light for a vehicle including a holographic structure which is capable of diffracting illuminated light from a light source with good efficiency without increasing the performance of the light source.

SUMMARY OF THE INVENTION

According to the present invention, there is a light arrangement for a vehicle, comprising:

a holographic structure secured in the vehicle; and a light source including a plurality of diverging light sources, each emitting a diverging light for interference with said holographic structure;

said holographic structure being in the form of a hologram assembly including a plurality of holograms produced by holography by exposure to a converging beam from the area where said light source is arranged after mounting said hologram assembly in the vehicle.

DETAILED DESCRIPTION OF THE EMBODIMENT

Figure 1:
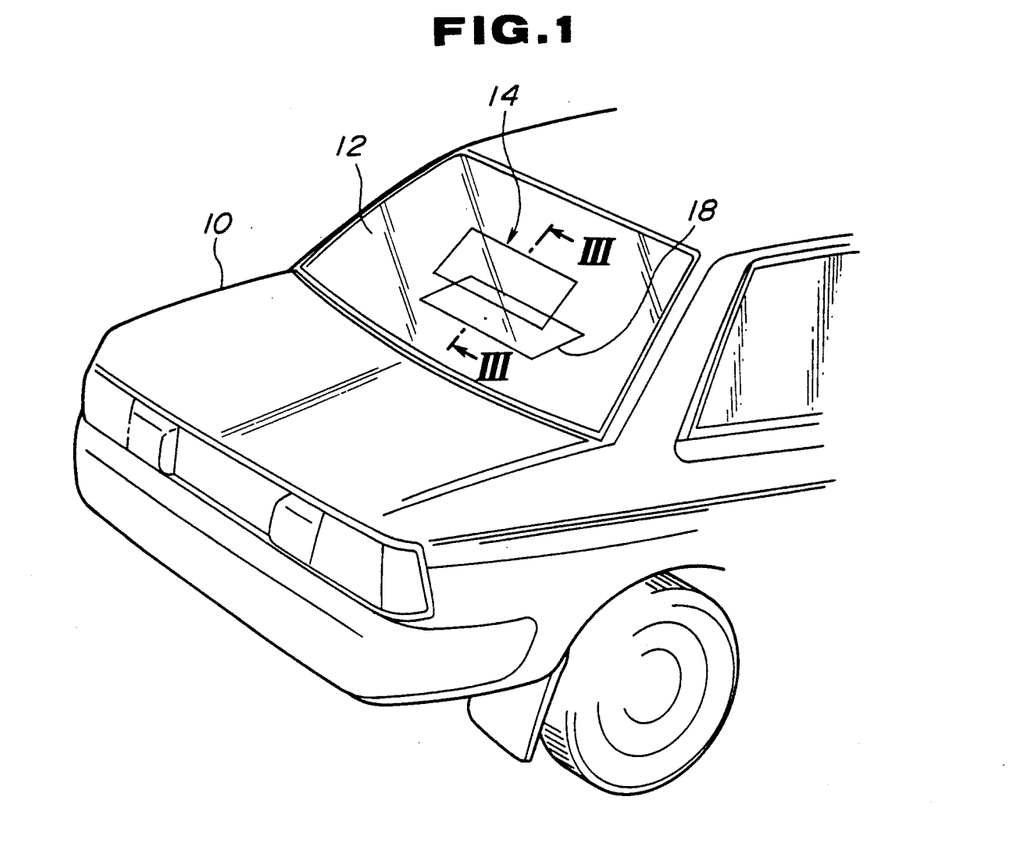
FIG. 1 is a simplified schematic diagram illustrating a center high mounted brakelight installed in a vehicle.

Referring now to FIG. 1, a vehicle 10 includes a rear window 12. A holographic structure 14 is secured adjacent to the rear window 12. In this embodiment, the holographic structure 14 is in the form of a sheet of transparent hologram assembly 16 affixed onto the interior surface of the rear window 12. The hologram assembly 16 is divided into and consists of a plurality of small holograms as shown in FIG. 2.

Figure 3:
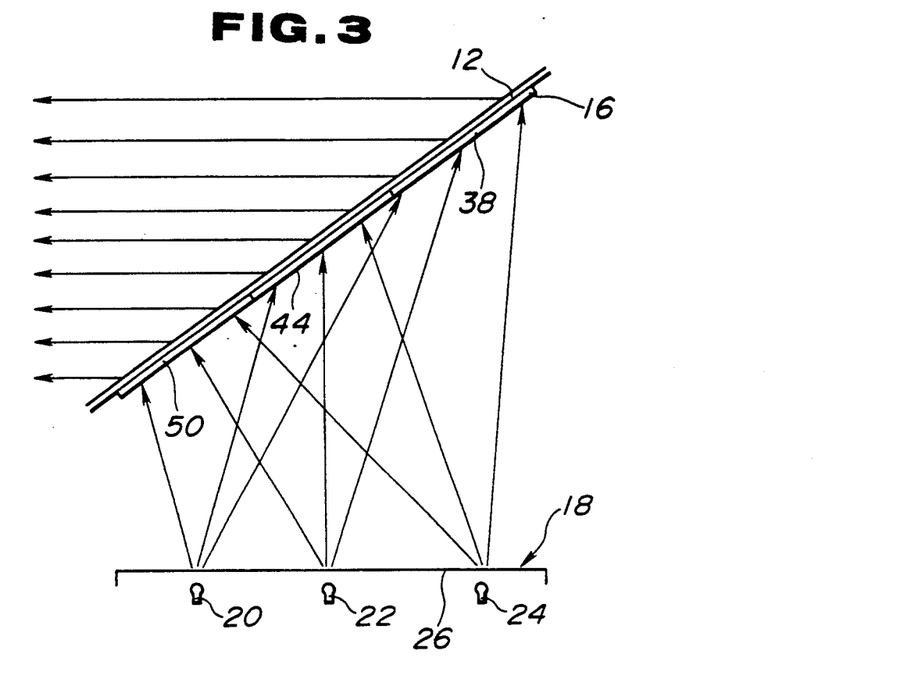
FIG. 3 is a section taken through line III—III in FIG. 1, illustrating main components of the brakelight apparatus.
Figure 4:
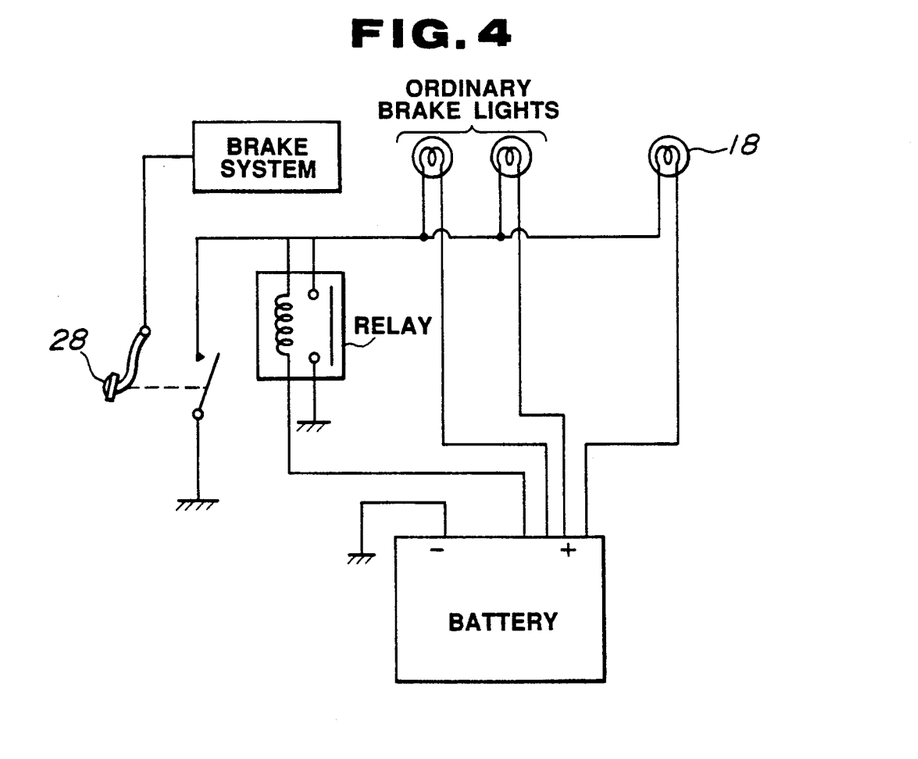
FIG. 4 is a schematic view of a brakelight circuit.

Referring to FIGS. 3 and 4, the hologram assembly 16 is shown in combination with a light source 18 capable of projecting light for interfacing with the hologram assembly 16 and subsequent diffraction to the rear of the vehicle 10. The light source 18 is mounted in the vehicle 10 in a low position of the rear window 12. In this embodiment, the light source 18 is disposed within a rear shelf panel below the rear window 12. The light source 18 includes a plurality of bulbs, as represented at 20, 22 and 24, and a red filter 26. This light source 18 is not provided with any lens, so that light projected from the light source 18 diverges. The light from the light source 18 diverges out of a flat surface having an rectangular dimension as illustrated in FIG. 1. Thus, this light source 18 serves as a surface light. The light source 18 is connected in series with the brake light circuit as shown in FIG. 4 to be activated by a brake foot pedal 28.

Figure 2:
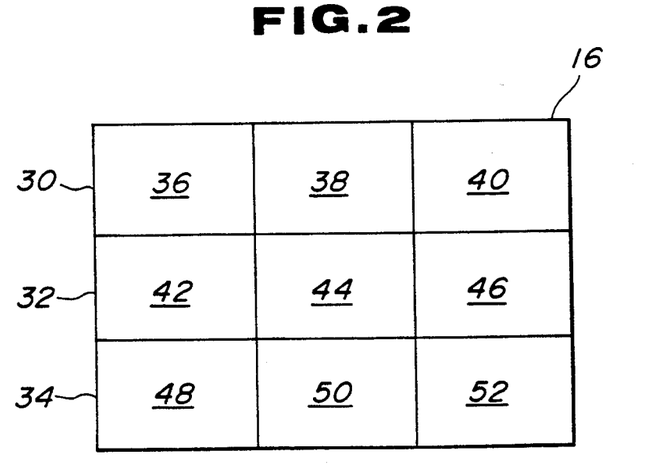
FIG. 2 is a schematic view of a holographic structure which is a main component of the brakelight apparatus.

Referring to FIG. 2, the hologram assembly 16 includes three rows of divided small holograms, namely, an upper row 30, a middle or central row 32 and a lower row 34, each including three divided small holograms. Namely, the upper row 30 includes three small holograms 36, 38 and 40, the central row 32 includes three small holograms 42, 44 and 46, and the lower row 34 includes three small holograms 48, 50 and 52. In this embodiment, these small holograms 36, 38, 40, 42, 44, 46, 48, 50 and 52 have different diffraction characteristics, respectively.

Figure 5:
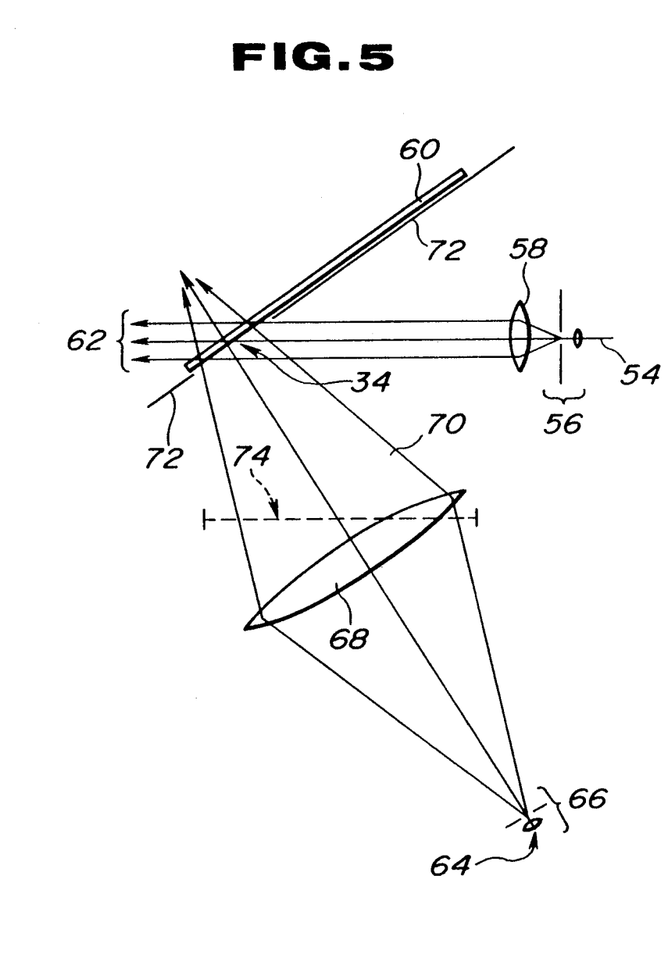
FIG. 5 is an optical arrangement for producing each of small holograms constituting a lower row of the holographic structure shown in FIG. 2.
Figure 6:
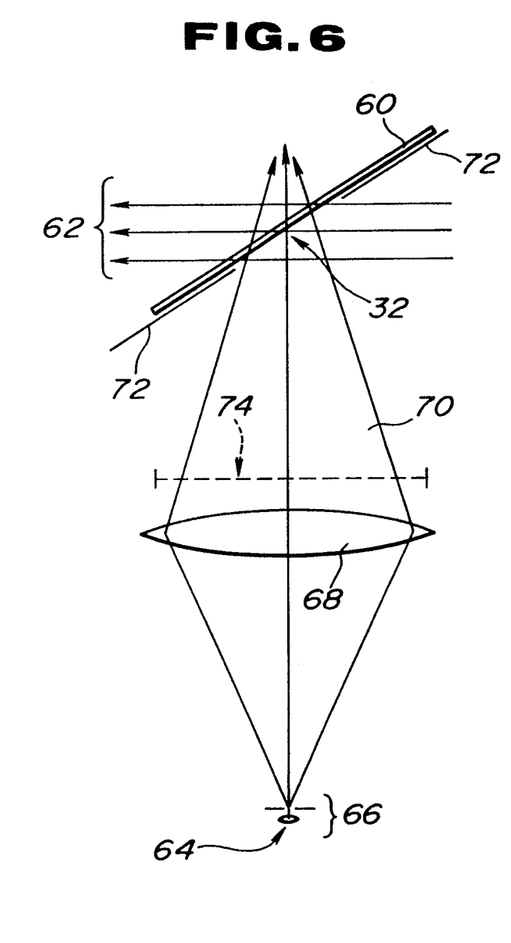
FIG. 6 is an optical arrangement for producing each of small holograms constituting a middle row of the holographic structure shown in FIG. 2.
Figure 7:
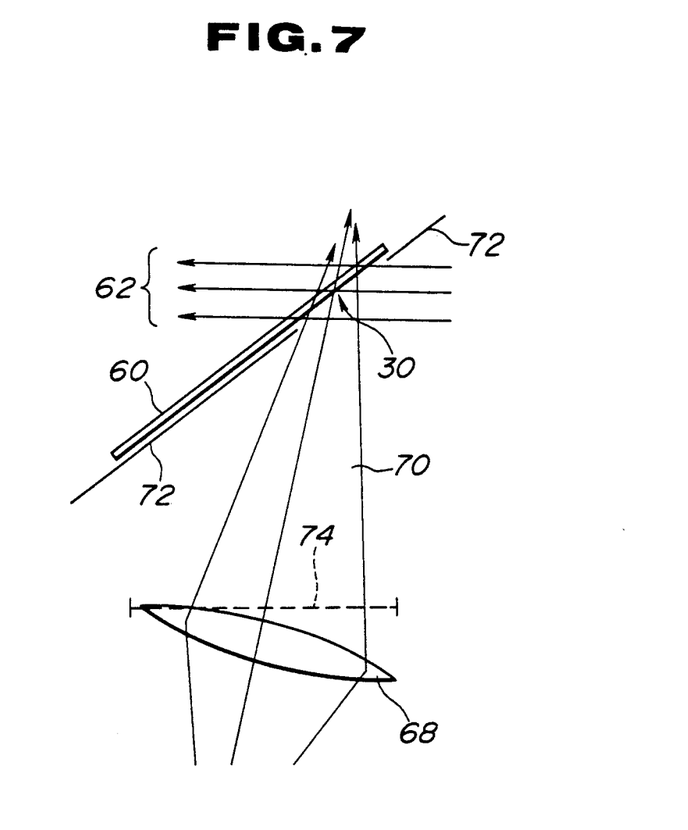
FIG. 7 is an optical arrangement for producing each of small holograms constituting an upper row of the holographic structure shown in FIG. 2.

Referring to FIGS. 5, 6 and 7, there are described how to produce the above-mentioned small holograms 36, 38, 40, 42, 44, 46, 48, 50 and 52.

FIG. 5 shows an arrangement for producing, by holography, the small holograms 48, 50 and 52 of the lower row 34, FIG. 6 shows an arrangement for producing, by holography, three small holograms 42, 44 and 46 of the central row 32, and FIG. 7 shows an arrangement for producing, by holography, three small holograms 36, 38 and 40 of the upper row 34.

Referring to FIG. 5, the arrangement includes a first laser source 54 and a spatial filter 56. The light from the laser source 54 is directed, by means of an appropriate lens system as represented by a lens 58, onto a film of photosensitive medium 60, such as a dichromated gelatin (DCG) film or a phtopolymer film. This collimated light is a reference beam 62. A second laser source 64 and a spacial filter 66 are arranged. The light from the laser source 64 is directed by means of an appropriate lens system as represented by a lens 68 onto the film 60. This converging light is an object beam 70. The film 60 is covered by a mask 72 except that portion which a small hologram is to be produced.

Referring to FIG. 5, let us now consider the case where one of the small holograms 48, 50 and 52 constituting the lower row 34 is to be produced. That portion of the film 60 which is uncovered by the mask 72 is exposed to the collimated reference beam 62 and the convering object beam 70 passing through an area which the light source 18 is arranged after the film 60 has been affixed to the rear window 12. This area is illustrated by broken line at 74. The point of forcus of the converging object beam 70 is determined such that the portion which the converging object beam 70 intersects with the area 74 covers the area where all of the bulbs of the light source 18 are to be arranged. The incident angle which the central line of the reference beam 62 makes with the film 60 and the form of the reference beam 62 are determined with due consideration of in what manner the diffracted light is to be projected rearward of the vehicle 10. Thus, the reference beam is not limited to the collimated beam and may take the form of a diverging or convering beam.

Referring to FIG. 6, that portion of the film 60 which is uncovered by the mask 72 is exposed to the reference beam 62 and the converging object beam 70 to produce one of small holograms 42, 44 and 46 constituting the central row 32.

Referring to FIG. 7, that portion of the film 60 which is uncovered by the mask 72 is exposed to the reference beam 62 and the converging object beam 70 to produce one of small holograms 36, 38 and 40 constituting the upper row 30.

As is appreciated from the exposure system described above, each of the small holograms 36, 38, 40, 42, 44, 46, 48, 50 and 52 can diffract all of light projected by all of the bulbs of the light source 18. This results in increased efficiency in utilizing light from the light source 18 and increased brightness as viewed from the rea of the vehicle 10.

According to this embodiment, the hologram assembly 16 is capable of interfering with almost all of light projected from the light source 18 for diffraction to the rear of the vehicle 10. Since each of the small holograms 36, 38, 40, 42, 44, 46, 48, 50 and 52 interfers with light from each of the bulbs 20, 22 and 24, for example, of the light source 18, the brightness is increased with the same light source.

Figure 12:
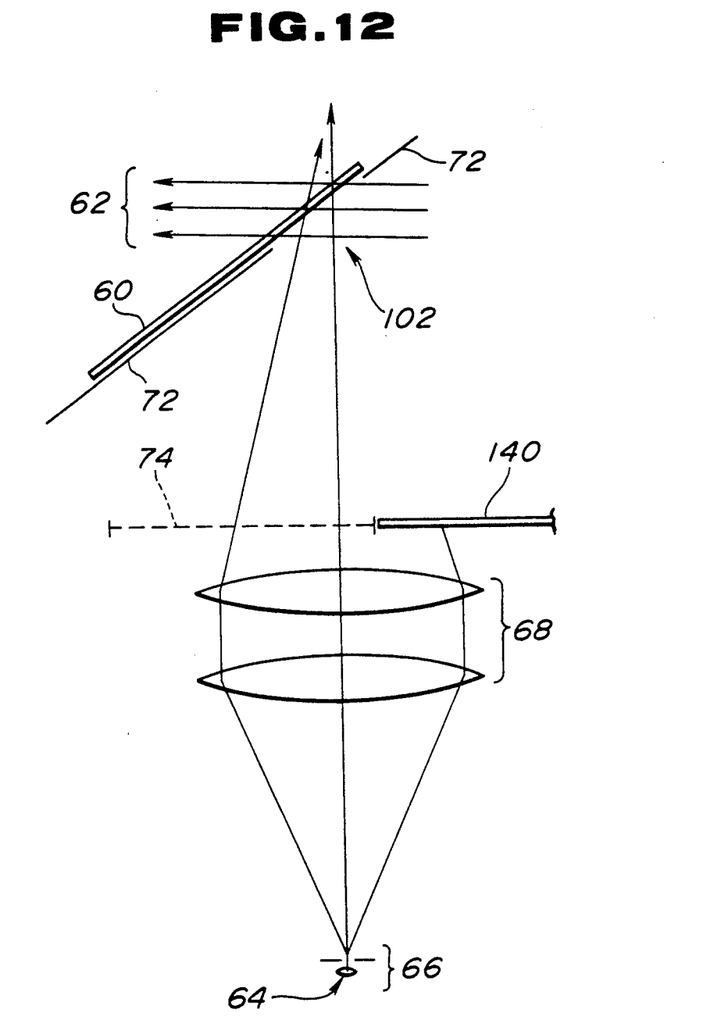
FIG. 12 is an optical arrangement for producing each of small holograms constituting the upper row which forms a part of the periphery of the holographic structure shown in FIG. 8.
Figure 13:
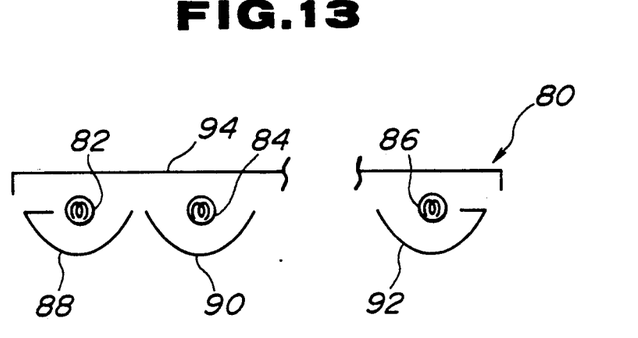
FIG. 13 is a schematic view of a light source of the second embodiment.

A second embodiment is described with reference to FIGS. 8 to 13. FIG. 13 shows a light source 80 used in this embodiment. The light source 80 includes a plurality of bulbs as represented at 82, 84 and 86, a plurality of reflectors, as represented at 88, 90 and 92, each of which generally confine the illumination of the associated bulb to a spherical triangle with an apex angle of 60 degrees. The light source 80 includes a red filter 94. For ease of installation within a limited space, the upper edge of each of the reflectors 88, 90 and 92 are arranged as high as the bulbs 82, 84 and 86.

Figure 8:
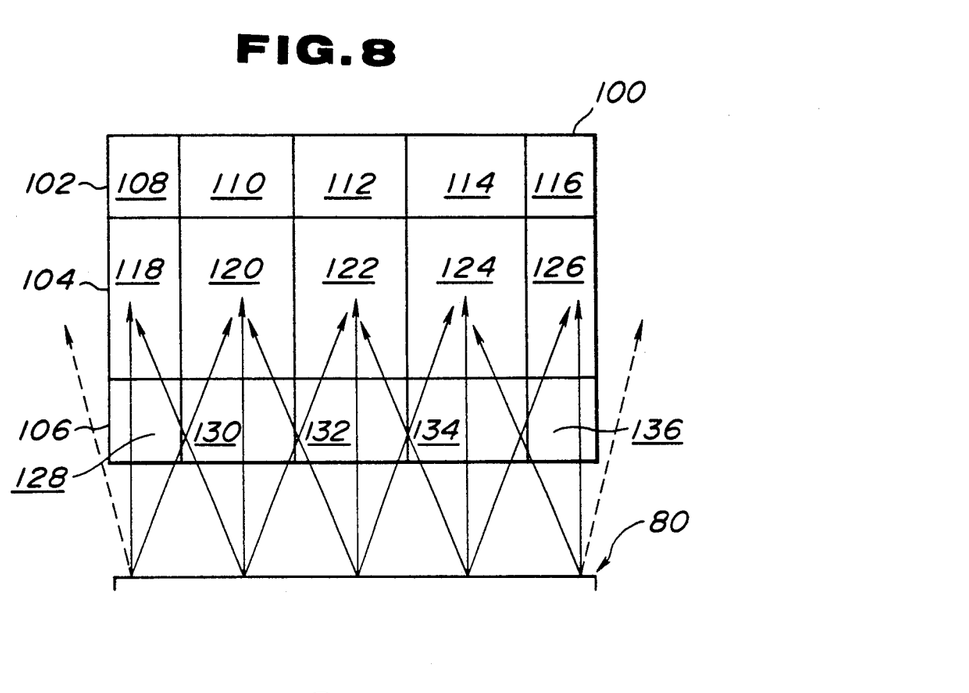
FIG. 8 is a schematic view of main components of a second embodiment.

Similarly to the hologram assembly 16 of the first embodiment, a hologram assembly 100 is divided into and consists of a plurality of small holograms as shown in FIG. 8.

Referring to FIG. 8, the hologram assembly 100 includes three rows of divided small holograms, namely, an upper peripheral row 102, a middle or central row 104 and a lower peripheral row 106, each including five small holograms. Namely, the peripheral upper row 102 includes five small holograms 108, 110, 112, 114 and 116, the central row 104 includes five small holograms 118, 120, 122, 124 and 126, and the lower peripheral row 106 includes five small holograms 128, 130, 132, 134 and 136. The five small holograms 108, 110, 112, 114 and 116 of the upper row 102, the five small holograms 128, 130, 132, 134 and 136 of the lower row 106, and two laterally-most spaced small holograms 118 and 126 of the middle row 104 cooperate to form the periphery of the hologram assembly 100 surrounding the central three small holograms 120, 122 and 124.

Figure 10:
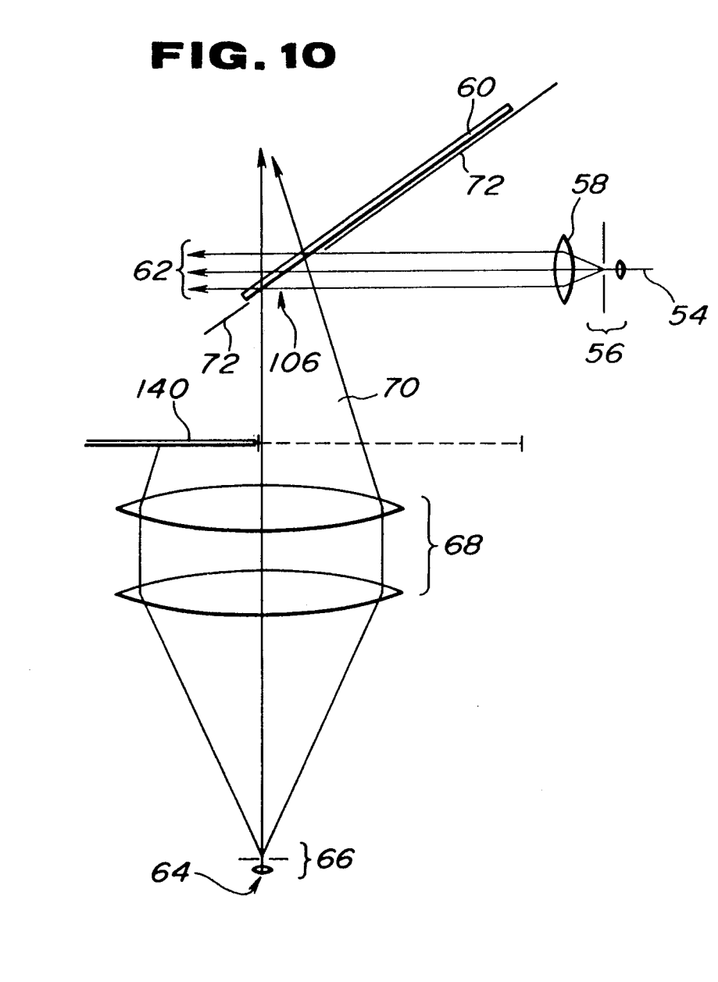
FIG. 10 is an optical arrangement for producing each of small holograms constituting a lower row forming a part of the periphery of a holographic structure shown in FIG. 8.

The manner of producing the small holograms forming the periphery is described with reference to 10 and 12, while the manner of producing the three small holograms 120, 122 and 124 surrounded by the periphery is described with reference to FIG. 11.

As different from the exposure system described with reference to FIGS. 5, 6 and 7, the incident angle which the central axis of the converging object beam 140 remains unchanged in the exposure system illustrated in FIGS. 10, 11 and 12.

Figure 11:
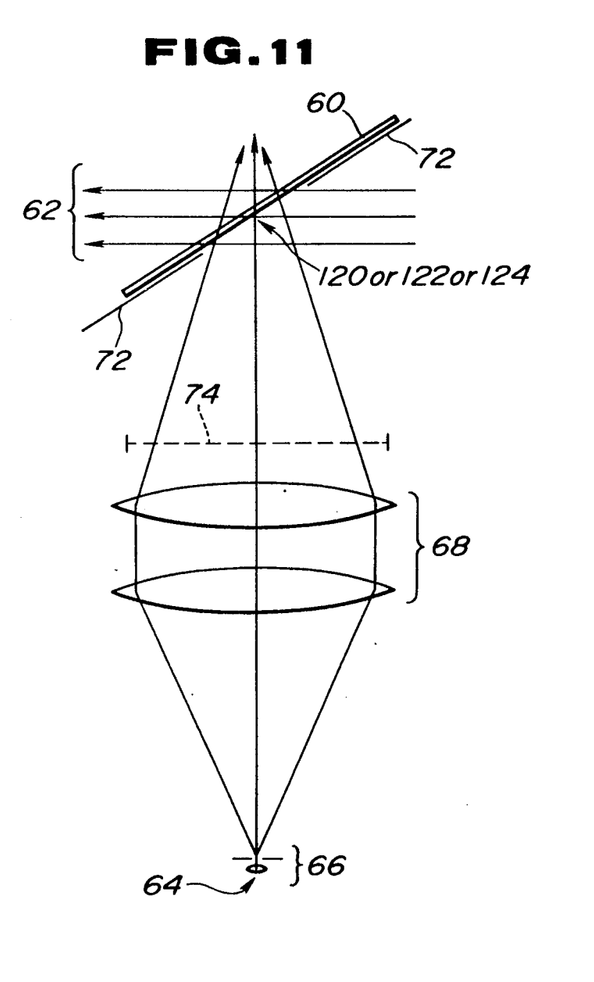
FIG. 11 is an optical arrangement for producing each of divisions consituting a middle row of the holographic structure shown in FIG. 8.

Referring to FIG. 11, a film 60 is exposed to a collimated reference beam 62 and a converging object beam 70 to produce the central three holograms 120, 122 and 124 with the incident angle of the central axis of the converging object beam 70 remain unchanged. Thus, the exposure is effected without tilting a lens system 68.

As will be readily understood from FIGS. 10 and 12, the periphery of the film 60 is exposed to the reference beam 62 and the converging object beam 70 passing through an area 74 with the incident angle remain unchanged to produce the small holograms 108, 110, 112, 114, 116, 118, 126, 128, 130, 132, 134 and 136 which constitute the periphery. In order to block a portion of the convering object beam, a mask 140 defines the outer periphery of the area 74.

It will be appreciated that the exposure system illustrated in FIGS. 10, 11 and 12 is less complicated than the exposure system used in the first embodiment since the incident angle is not changed.

Figure 9:
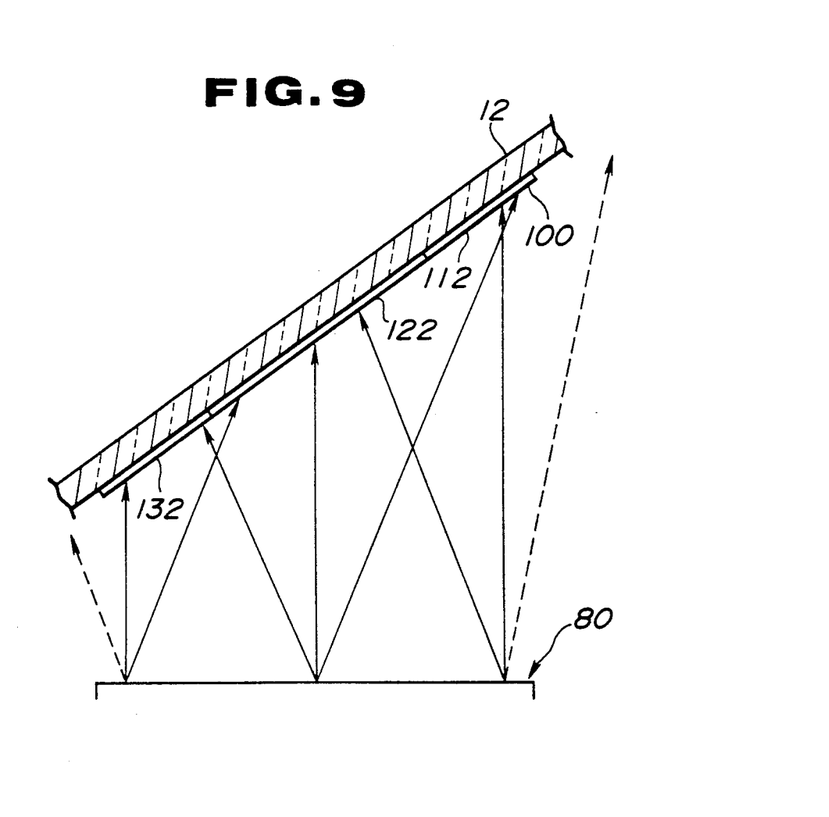
FIG. 9 is a similar section to FIG. 3, illustrating the main components of the second embodiment.

From FIGS. 8 and 9, it will be appreciated that each of the small holograms 108, 110, 112, 114, 116, 118, 126, 128, 130, 132, 134 and 136 which constitute the periphery interferes with light from at least one of the bulbs, as represented at 82, 84 and 86, of the light source 80. According this second embodiment, light emitted outward of the peripheral of the light source 80, as illustrated by broken arrows in FIGS. 8 and 9 does not interference with the hologram assembly 100.

Figure 14:
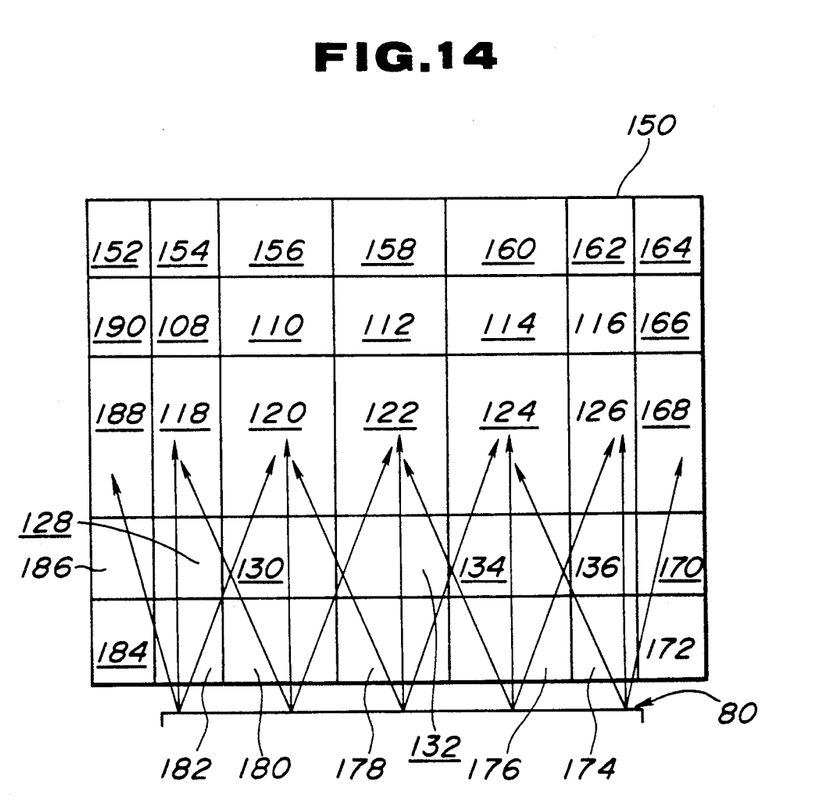
FIG. 14 is a schematic view of main components of a third embodiment.
Figure 15:
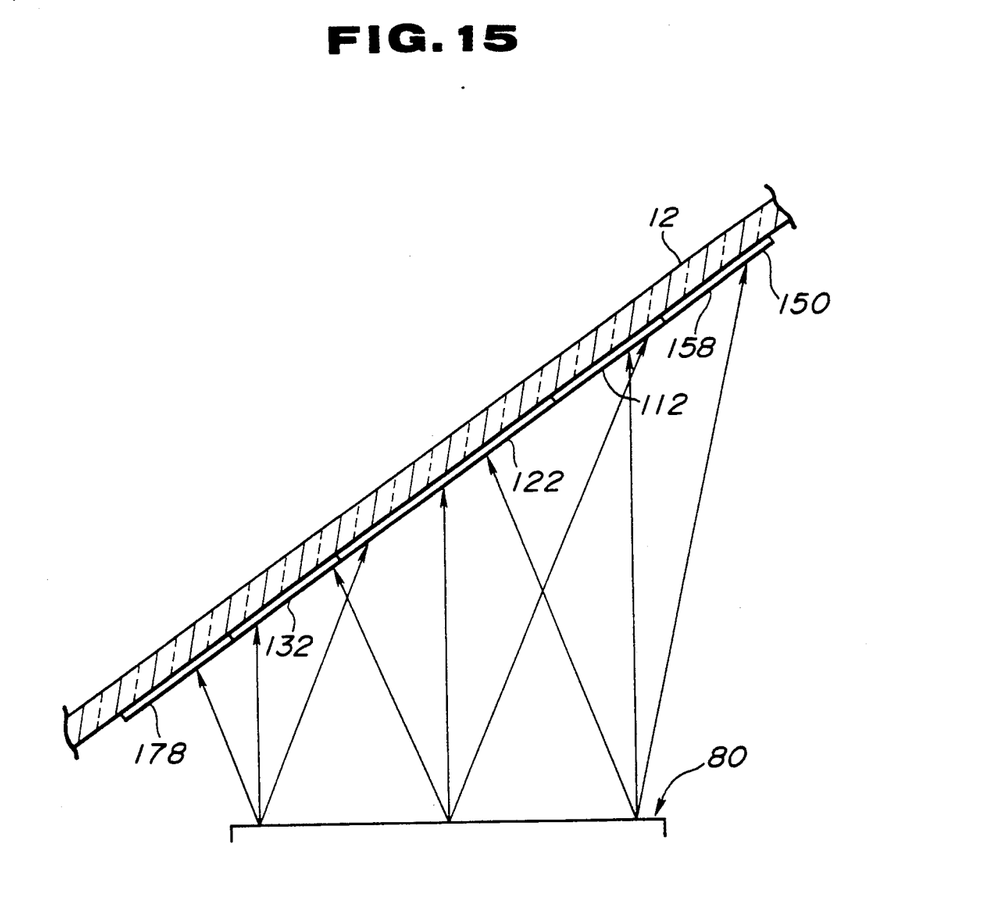
FIG. 15 is a similar section to FIG. 3, illustrating the main components of the third embodiment.

In order for diffraction of such illuminated light, a third embodiment of a hologram assembly 150 as illustrated in FIGS. 14 and 15 includes a series of twenty (20) small holograms 152, 154, 156, 158, 160, 162, 164, 166, 168, 170, 172, 174, 176, 178, 180, 182, 184, 186, 188 and 190 which constitute an outer extenbded periphery surrounding the periphery constituted by small holograms 108, 110, 112, 114, 116, 118, 126, 128, 130, 132, 134 and 136. These holograms consituting the outer extended periphery are produced by the exposure system as illustrated in FIGS. 10 and 12. These holograms are capable of diffracting the illuminated light which is not used in the second embodiment (see the broken arrows in FIGS. 8 and 9).

What is claimed is:

1. A light arrangement for a vehicle having a window, comprising:

a hologram assembly affixed adjacent the window; and a light source including a plurality of diverging light sources, each emitting a diverging light for interference with said hologram assembly;

said hologram assembly including a plurality of holograms, wherein each of said plurality of holograms interferes with diverging light from each of said plurality of diverging light sources.

2. A light arrangement for a vehicle having a window, comprising:

a hologram assembly affixed adjacent the window; and a light source mounted within the vehicle, said light source including a plurality of spaced apart diverging light sources, each of said light sources emitting diverging light for interference with said hologram assembly;

said hologram assembly including a plurality of holograms, wherein each of said plurality of holograms interferes with light from said light source.

3. A light arrangement for a vehicle having a rear window, comprising:

a sheet of hologram assembly affixed adjacent the rear window; and a light source mounted within the vehicle, said light source including a plurality of spaced apart diverging light sources, each of said light sources emitting diverging light for interference with said hologram assembly;

said hologram assembly being divided into and consisting of a plurality of holograms which interfere with light from at least two of said plurality of spaced apart diverging light sources.

4. A light arrangement for a vehicle having a rear window, comprising:

a hologram assembly affixed adjacent the rear window; and a light source mounted within the vehicle, said light source including a plurality of diverging light sources, each emitting diverging light for interference with said hologram assembly;

said hologram assembly including a plurality of holograms, at least one of said plurality of holograms interfering with diverging light from at least two of said plurality of diverging light sources.

* * * * *